United States Patent
Bodziony et al.

(10) Patent No.: US 11,880,405 B2
(45) Date of Patent: Jan. 23, 2024

(54) METHOD FOR SEARCHING SIMILAR IMAGES IN AN IMAGE DATABASE USING GLOBAL VALUES OF A SIMILARITY MEASURE FOR DISCARDING PARTITIONS OF THE IMAGE DATABASE

(71) Applicant: International Business Machines Corporation, Armonk, NY (US)

(72) Inventors: Michal Bodziony, Tęgoborze (PL); Bartosz Tomasik, Cracow (PL); Marcin Filip, Cracow (PL); Wojciech Mis, Cracow (PL); Tomasz Zatorski, Cracow (PL); Marcin Luczynski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 17/202,720

(22) Filed: Mar. 16, 2021

(65) Prior Publication Data
US 2022/0300549 A1  Sep. 22, 2022

(51) Int. Cl.
*G06F 16/50* (2019.01)
*G06F 16/532* (2019.01)
*G06F 16/583* (2019.01)
*G06F 16/56* (2019.01)

(52) U.S. Cl.
CPC ............ *G06F 16/532* (2019.01); *G06F 16/56* (2019.01); *G06F 16/583* (2019.01)

(58) Field of Classification Search
CPC ....... G06F 16/532; G06F 16/56; G06F 16/583
See application file for complete search history.

(56) References Cited

U.S. PATENT DOCUMENTS

| 6,973,452 B2 | 12/2005 | Metzger | |
|---|---|---|---|
| 2009/0252413 A1* | 10/2009 | Hua | G06V 10/50 382/224 |
| 2015/0242506 A1 | 8/2015 | Dickie | |
| 2018/0276250 A1* | 9/2018 | Badoiu | G06F 16/2246 |

OTHER PUBLICATIONS

"Database query execution time optimization with limiting number of low-level statistics comparisons", An IP.com Prior Art Database Technical Disclosure, Authors et. al.: Disclosed Anonymously, IP.com No. IPCOM000240483D, IP.com Electronic Publication Date: Feb. 3, 2015, 6 pages.

(Continued)

*Primary Examiner* — Kristopher Andersen
(74) *Attorney, Agent, or Firm* — Daniel J. Hakimi

(57) ABSTRACT

A computer-implemented method for searching for a similar image in an image database includes receiving a query image, computing a value of a similarity measure of the query image, comparing the value of the similarity measure of the query image with metadata of the partitions, discarding at least one partition of the image database based on the comparison of the value of the similarity measure of the query image with the metadata, comparing the images of at least one of the remaining partitions with the query image, and selecting at least one image of the at least one partition of the remaining partitions as the similar image based on the comparison of the images of the at least one of the remaining partitions with the query image.

18 Claims, 6 Drawing Sheets

(56) References Cited

OTHER PUBLICATIONS

"Method of limiting I/O operations for spatial data in data warehouses", An IP.com Prior Art Database Technical Disclosure, Authors et. al.: Disclosed Anonymously, IP.com No. IPCOM000248962D, IP.com Electronic Publication Date: Jan. 24, 2017, 6 pages.
"Way of optimizing space required for processing queries on processing unit level in MPP systems", An IP.com Prior Art Database Technical Disclosure, Authors et. al.: Disclosed Anonymously, IP.com No. IPCOM000227866D, IP.com Electronic Publication Date: May 23, 2013, 6 pages.
Torralba et al., "LabelMe: Online Image Annotation and Applications", Proceedings of the IEEE vol. 98, Issue 3, Aug. 2010, pp. 1467-1484, Published Jun. 10, 2010, DOI: 10.1109/JPROC.2010.2050290.
Zauner, Christoph, "Implementation and Benchmarking of Perceptual Image Hash Functions", DIPLOMARBEIT, eingereicht am Fachhochschul-Masterstudiengang, Sichere Informationssysteme, in Hagenberg, im Jul. 2010, 107 pages.

\* cited by examiner

METHOD FOR SEARCHING SIMILAR IMAGES IN AN IMAGE DATABASE USING GLOBAL VALUES OF A SIMILARITY MEASURE FOR DISCARDING PARTITIONS OF THE IMAGE DATABASE

BACKGROUND

The present invention relates to the field of database technology, and more specifically, to a method for searching similar images in an image database.

Image databases may be used for searching images that are similar to a given image. Performing a search for similar images may comprise comparing the given image with the images of the database. As the number of images stored in the database increases, so too does the computational resources required to perform the search. In addition, computational time may evolve exponentially with the number of the images of the database.

SUMMARY

According to one embodiment of the present invention, a computer-implemented method for searching for a similar image in an image database, the image database comprising partitions with images is disclosed. The computer-implemented method includes receiving a query image. The computer-implemented method further includes computing a value of a similarity measure of the query image. The computer-implemented method further includes comparing the value of the similarity measure of the query image with metadata of the partitions, the metadata comprising at least one respective global value of the similarity measure of each partition, the respective global value being determined based on the respective values of the similarity measures assigned to the images of a respective partition. The computer-implemented method further includes discarding at least one partition of the image database based on the comparison of the value of the similarity measure of the query image with the metadata. The computer-implemented method further includes comparing the images of at least one of the remaining partitions with the query image. The computer-implemented method further includes selecting at least one image of the at least one partition of the remaining partitions as the similar image based on the comparison of the images of the at least one of the remaining partitions with the query image.

According to another embodiment of the present invention, a computer program product for searching for a similar image in an image database, the similar image being similar to a query image, and the image database comprising partitions with images the computer program product is disclosed. The computer system includes one or more computer-readable storage media and program instructions stored on the one or more computer readable storage media. The program instructions include instructions to receive a query image. The program instructions further include instructions to compute a value of a similarity measure of the query image. The program instructions further include instructions to compare the value of the similarity measure of the query image with metadata of the partitions, the metadata comprising at least one respective global value of the similarity measure of each partition, the respective global value being determined based on the respective values of the similarity measures assigned to the images of a respective partition. The program instructions further include instructions to discard at least one partition of the image database based on the comparison of the value of the similarity measure of the query image with the metadata. The program instructions further include instructions to compare the images of at least one of the remaining partitions with the query image. The program instructions further include instructions to select at least one image of the at least one partition of the remaining partitions as the similar image based on the comparison of the images of the at least one of the remaining partitions with the query image.

According to another embodiment of the present invention, a computer system for searching a similar image in an image database, the similar image being similar to a query image, the image database comprising partitions with images, each image being assigned to a respective value of a similarity measure for comparing the respective image with the query image is disclosed. The computer system includes one or more computer processors, one or more computer readable storage media, computer program instructions, the computer program instructions being stored on the one or more computer readable storage media for execution by the one or more computer processors. The program instructions include instructions to receive a query image. The program instructions further include instructions to compute a value of a similarity measure of the query image. The program instructions further include instructions to compare the value of the similarity measure of the query image with metadata of the partitions, the metadata comprising at least one respective global value of the similarity measure of each partition, the respective global value being determined based on the respective values of the similarity measures assigned to the images of a respective partition. The program instructions further include instructions to discard at least one partition of the image database based on the comparison of the value of the similarity measure of the query image with the metadata. The program instructions further include instructions to compare the images of at least one of the remaining partitions with the query image. The program instructions further include instructions to select at least one image of the at least one partition of the remaining partitions as the similar image based on the comparison of the images of the at least one of the remaining partitions with the query image.

BRIEF DESCRIPTION OF THE DRAWINGS

In the following, embodiments of the invention are explained in greater detail, by way of example only, making reference to the drawings in which.

DETAILED DESCRIPTION

Figure 1:
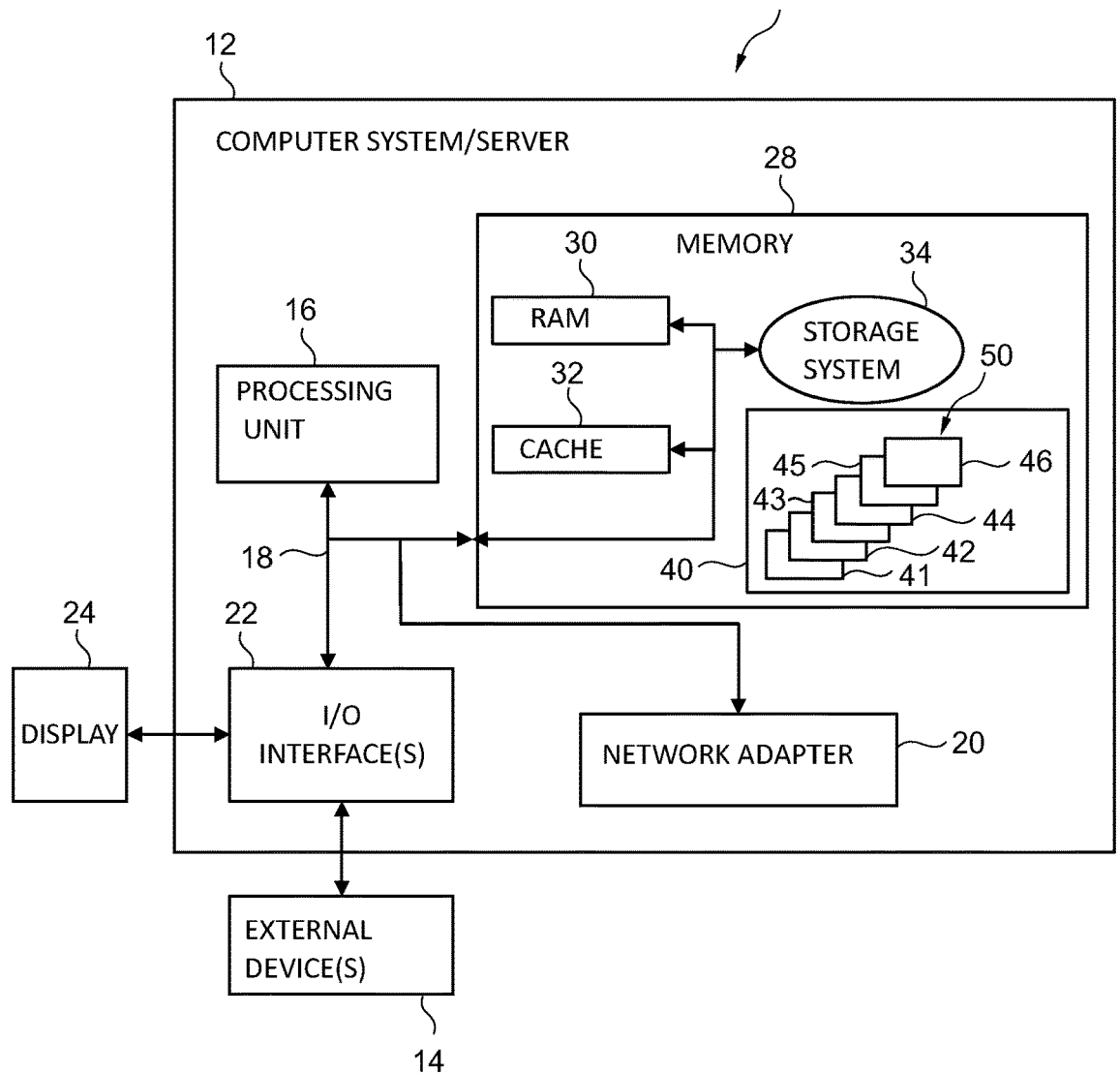
FIG. 1 illustrates a computer system in accordance with the at least one embodiment of the present invention.

The present invention relates to the field of database technology, and more specifically, to a method for searching for similar images in an image database.

Searching for similar images in an image database involves comparing a given input image with the images stored in the database. When there is a large number of images stored in the database, there is also high computational need in order to perform the search. Not only does it take more computational resources to perform the search, but it can also take up both the users time. However, performing a larger number of searches for images in the database will likely result in finding the most similar images to an input image. Embodiments of the present invention recognize searching for similar images in a database of millions of images is computationally an I/O (Input/Output) intensive process. Embodiments of the present invention recognize that comparing the searched image with all the images in the database is also a time-consuming approach. Embodiments of the present invention further recognize comparing hashes of images is not computationally practical.

Embodiments of the present invention improve upon the foregoing deficiencies of comparing input images with images stored in databases by optimizing zone maps for graphics and image data. Embodiments of the present invention further improve upon the foregoing deficiencies by using a query language extension function with low-level statistics and optimizing the distance related queries. Low level statistics include statistics kept on small chunks at the data level. Embodiments of the present invention limit read operations on graphics blob columns in data warehouse environments. Embodiments of the present invention use a low-level statistic set of reference points which pre-define a set of base model images. For example, a base model image can include: picture of human, plant, landscape, vehicle, colorful picture, drawing, etc.

Embodiments of the present invention use a value of the similarity measure of the respective image if the respective hash value of the respective image and the value of the similarity measure of the query image is a hash value of the query image. Using the hash values of the images and the hash value of the query image may be advantageous as these hash values may present a very compact form of capturing information given by the feature vector of the images and the feature vector of the query image respectively.

The similarity measure may be a measure which is suitable for assessing a respective similarity between the query image and the respective image of the partitions. The value of the similarity measure of the query picture may be compared with the value of the similarity measure of the respective image in order to assess the respective similarity. In one example, a degree of the respective similarity may be higher to a given comparison level of similarity if a difference between the value of the similarity measure of the query picture and the value of the similarity measure of the respective image is lower than a predetermined comparison threshold.

The comparison of the images of the at least one of the remaining partitions with the query image may be performed by comparing the value of the similarity measure of the query picture with the value of the similarity measure of the respective image of the at least one partition of the remaining partitions.

The comparison of the value of the similarity measure of the query image with the metadata may be performed by comparing the respective global value of the similarity measure being assigned to the respective partition with the value of the similarity measure of the query image. By comparing the value of the similarity measure of the query image with the metadata, the value of the similarity measure of the query image does not need to be compared with each value of the similarity measure of each image of each partition in order to perform the discarding. Hence, a usage of the global values may enable the discarding with comparatively low computational costs.

The discarding of the at least one partition may reduce the computational effort for searching for a similar image in the image database. This is due to the fact that the discarded partition may not be comprised by the set of the remaining partitions and the similar image may be comprised by the set of the remaining partitions. Hence, the values of the similarity measure of the images of the discarded partition may not be compared with the value of the similarity measure of the query image according to the presented method. As such, the computational effort for searching for the similar image may be reduced.

The term "image" as used herein refers to data for generating the image, for example, an image file. Thus, in one example, the query image may be realized in the form of a query image file and the images of the partitions may be each realized in the form an image file. The term "images" describes the images of the image database, whereas the term "query image" refers to the query image (i.e., the input image that is used for comparison with images in the image database to find similar images to the input image).

The value of the similarity measure may be a real number. In one example, the value of the similarity measure may be designed in the form of a vector comprising several single values, for example single real numbers, as entries. In the latter case, the comparison between the value of the similarity measure of the query image and the value of the similarity measure of the respective image of the partitions may be performed by computing a norm of a respective difference vector. The respective difference vector may be in the form of a difference between the value of the similarity measure of the query image and the value of the similarity measure of the respective image.

The similarity measure may describe features of the query image and respective features of the images. For example, the similarity measure may describe a number of edges, curvy continuous lines and/or predefined objects or a distribution of colors or black and white pixels being comprised by the query image and the images respectively. The predefined objects may be geometric objects, for example a circle or a rectangle, or real world objects, for example, a car, a table, a plant, a person, a building, and so forth. The predefined objects may each comprise a predefined size in relation to a reference object with a known fixed size, for example, a football or a traffic sign.

According to one embodiment, the method may further comprise extracting the features of the query image and the respective features of the images. The extracting of the respective features may involve performing a pattern recognition. The pattern recognition may comprise detecting the number of edges, of the curvy continuous lines and/or of the predefined objects and/or the distribution of colors or black and white pixels.

In one example, the value of the similarity measure of the query image and of the respective images may each comprise a first number of recognized edges having a first length, a second number of recognized edges having a second length, a third number of recognized curvy continuous lines comprising a first curvature, a fourth number of recognized curvy continuous lines comprising a second curvature, a fifth number of predefined objects of a first type of objects, and/or a sixth number of predefined objects of a second type of objects. In one example, the value of the similarity measure of the respective image may be a feature vector of the respective image and the value of the similarity measure of the query image may be a feature vector of the query image. The entries of each feature vector may be the corresponding first, second, third, fourth, fifth and/or sixth number according to the example given above.

The metadata may be considered as much more compact information about the images compared to, for example, indices indexing each image of the images of the partitions. The metadata may comprise information about the images. In one example, the metadata may comprise a first set of information about all images of a first partition of the image database and a second set information about all images of a second partition of the image database. In one example, the first set information may be a first global value of the values of the similarity measure of all images of the first partition, in the following referred to as first global value of the first partition. Analogously, the second set information may be a first global value of the values of the similarity measure of all images of the second partition, in the following referred to as first global value of the second partition.

According to one embodiment, the metadata may comprise a respective range of the similarity measures of the respective partition. For example, the metadata may comprise, for each partition, a respective range of the maximum and minimum number of edges, curvy continuous lines and/or predefined objects of the images of the respective partition. Using the respective ranges to describe the images of the respective partitions may allow for classification of each respective partition with respect to its range and the value of the similarity measure of the query image. The value of the similarity measure of the query image may, for example, comprise a number of edges of the query image, a number of curvy continuous lines of the query image, and/or a number of predefined objects being comprised by the query image. Performing such a classification may comprise discarding of at least one partition. The range of the discarded partition may, for example, not include the value of the similarity measure of the query image.

Furthermore, using the respective range of the similarity measures of the respective partition as the metadata may have the advantage that with only two values for each partition, for example, the minimal and the maximal number of edges, curvy continuous lines and/or predefined objects, important information of the images of the respective partition may be provided, which may reduce a running time of searching the similar image in the image database. For example, based on the respective range of the similarity measures of the respective partitions of one or more partitions may be discarded if the ranges of these partitions do not match the value of the similarity measure of the query image. In addition, the range in which the values of the similarity measures of the respective partitions lie may represent one of the most compact information of the images of these partitions and may therefore reduce the required storage capacity for storing the metadata.

According to one embodiment, each value of the similarity measure of the respective image of the partitions may indicate a degree of similarity of the respective image to a reference image. The value of the similarity measure of the query image may indicate a degree of similarity of the query image to the reference image according to this embodiment. In one example, the reference image may be used to compute the value of the similarity measure of the respective image and of the query image. If the value of the similarity measure of the respective image indicates a degree of similarity of the respective image to the reference image, this value of the similarity measure may be easily understood by a user performing the search of the similar image. In this case, the reference image may be available for the user to visualize the reference image to the user.

According to the aforementioned embodiment, the similarity measure may be used as a distance measure indicating a perceptual distance of the query image to the reference image and a respective perceptual distance of the respective image of the images of the partitions to the reference image. In an embodiment, the similarity measure in the form of the distance measure allows for a fast comparison of the values of the similarity measure, for example, with the values of the distance measure being a scalar, for example, a single real value. A value of the distance measure of the respective image may, for example, be a norm of a difference between a feature vector of the reference image and the feature vector of the respective image. The feature vector of the reference image may have a similar structure compared to the feature vectors of the images and the query image.

According to one embodiment, the respective global value of the similarity measure of each partition may be the minimal value of the similarity measure of the respective partition. Thus, the first global value of the first partition and the first global value of the second partition may be a first and a second minimal value of the similarity measure respectively.

In an embodiment, comparing the value of the similarity measure of the query image with the respective minimal value of the similarity measure of each partition specifies the discarded partition as one of the partitions comprising the greatest minimal value of the similarity measure. This may allow to establish a confidence that the remaining partitions comprise the images being most similar to the query image. Performing the discarding in such a manner allows for the discarding to be easily comprehended by the user. This embodiment may be combined with the embodiment described above in which each value of the similarity measure of the respective image may indicate a degree of similarity of the respective image to the reference image. This combination of embodiments may lead to a very comprehensible and user friendly method for searching for similar images.

According to one embodiment, the respective global value of the similarity measure may be the maximal value of the similarity measure of the respective partition. According to this embodiment, the first global value of the first partition and the first global value of the second partition may be a first and a second maximal value of the similarity measure, respectively. Comparing the value of the similarity measure of the query image with the respective maximal value of the similarity measure may enable to specify the discarded partition as one of the partitions comprising the lowest maximal value of the similarity measure.

According to one embodiment, the value of the similarity measure of the respective image may be computed by means of a perceptual hash function. The perceptual hash function may be configured to compute the feature vector of the respective image on the basis of the respective image and a respective hash value of the respective image on the basis of the feature vector of the respective image. According to this embodiment, the value of the similarity measure of the respective image may be dependent on the respective hash value of the respective image. The method may further comprise computing the value of the similarity measure of the query image by means of the perceptual hash function and the feature vector of the query image.

In an embodiment, the value of the similarity measure of the respective image is the respective hash value of the respective image and the value of the similarity measure of the query image is a hash value of the query image. In an embodiment, the hash value of the query image is computed using the feature vector of the query image. Using the hash values of the images and the hash value of the query image may be advantageous as these hash values may present a very compact form of capturing information given by the feature vector of the images and the feature vector of the query image respectively. As the hash values are computed by means of the perceptual hash function and on the basis of the respective feature vectors, the hash values may be sensitive to changes in the respective feature vectors. This may be different to using cryptographic hash functions which are known to be sensitive to changes in a single bit of an exemplary image. Hence, if one feature vector of one of the images is similar to the feature vector of the query image, the hash value of that image may be similar to the hash value of the query image and that image may be similar to the query image. Therefore, comparing the hash values of the images with the hash value of the query image may provide an efficient method to find a similar image.

The perceptual hash function may be configured to compute the feature vector of the respective image as a respective vector comprising values of a matrix being assigned to the respective image as entries of that vector. The matrix being assigned to the respective image may present the distribution of colors or black and white pixels of the respective image. Analogously, the feature vector of the query image may represent the distribution of colors or black and white pixels of the query image.

According to one embodiment, the value of the similarity measure of the respective image is dependent on the respective hash value of the respective image and a hash value of a reference image. In an embodiment, the hash value of the reference image is computed by means of the perceptual hash function. The method may further comprise computing the value of the similarity measure of the query image on the basis of the hash value of the reference image and a hash value of the query image. According to this embodiment, the hash value of the query image may be computed by means of the perceptual hash function. This embodiment may combine the advantage of using the hash values with the advantage of using the reference image.

By using the hash values, the similarity of the images and the query image to the reference image may be assessed faster. In addition to that, the hash values may require less storage capacity than the feature vectors. In one embodiment, the hash value of the respective image may be compared with the hash value of the reference image. The closer the hash value of the respective image may be to the hash value of the reference image, the more similar the respective image may be to the reference image.

According to one embodiment, the similarity measure of the respective image and the similarity measure of the query image may each be a respective distance measure. According to this embodiment, the similarity measure of the respective image may indicate a respective distance of the respective hash value of the respective image to the hash value of the reference image. Analogously, the similarity measure of the query image may indicate a distance of the hash value of the query image to the hash value of the reference image.

Using the respective distance measure indicating distances between the hash values as the respective similarity measure may have the advantage of realizing the respective similarity measure in a more compact form than, for example, using the norm of the difference between the feature vector of the reference image and the feature vector of the respective image or a difference between the hash values themselves.

According to one embodiment, the respective distance measure of the respective image and the distance measure of the query image may each be a hamming distance, a normalized hamming distance, or a bit rate error.

The hamming distance may be computed by comparing two binary hash values, for example, the hash value of the query image with the hash value of the reference image or the hash value of one of the images with the hash value of the reference image. Such a comparison may be performed bit-by-bit. The advantage of the hamming distance is an easy implementation and a simple further evaluation of the hamming distance. The higher the hamming distance, the less similar the two binary hash values being compared. The normalized hamming distance may be advantageous if a ratio of the different elements of the two binary hash values to the elements of the two binary hash values that do not differ need to be determined. The same holds for the bit error rate.

According to one embodiment, the respective distance measure of the respective image and the distance measure of the query image may each be an Euclidean distance measure. An Euclidean distance measure is the distance between two points, or the length of a line segment between two points. This may allow for determining the respective similarity measure as the respective distance measure if the hash values of the query image, the images, and/or the reference image comprise integers or real entries.

According to one embodiment, the perceptual hash function may be an average hash function. In an embodiment, the average hash function is configured to compute a respective mean value of all luminance values of the query image, of each reference image, and/or the reference image. In an embodiment, the average hash function is configured to compare each luminance value of the query image, of each reference image and/or the reference image, and generate a binary matrix with binary elements. In an embodiment, the elements of the matrix indicate whether the respective luminance value of the query image, of each reference image, and/or the reference image are greater or less than the respective mean value of all luminance values. In an embodiment, the average hash function allows for a simple implementation variant of the perceptual hash function. Furthermore it may enable a fast computation of the respective hash values.

According to one embodiment, the perceptual hash function is configured to compute the respective feature vector of the respective image using a discrete cosine transformation. The method may further comprise computing the feature vector of the query image using the discrete cosine transformation. In an embodiment the discrete cosine transformation is applied to compute a respective further feature vector of the respective image on the basis of the respective feature vector of the respective image and a further feature vector of the query image on the basis of the feature vector of the query image. The respective further feature vectors of the images may comprise lower frequencies of luminance values compared to the feature vectors of the images. The same may hold for the further feature vector of the query image and the feature vector of the image. In an embodiment the hash values being computed on the basis of the further feature vectors are more accurate and robust than hash values being computed on the basis of the feature vectors.

According to one embodiment, the perceptual hash function may comprise a Marr-Hildreth-operator. The Marr-Hildreth-operator is an edge detection method in digital images that detects continuous curves where there are strong and rapid variations in image brightness. In an embodiment, the Marr-Hildreth-operator detects edges within the images, the query image and/or the reference image. The Marr-Hildreth-operator may comprise a filter for detecting edges of the images, the query image and/or the reference image. The filter may be configured to convolve one of the images or the query image with the Laplacian of the Gaussian function to obtain a respective convolved image. The Marr-Hildreth-operator may be configured to detect zero crossings within the respective convolved image.

According to one embodiment, the perceptual hash function may be a radial variance hash function. The radial variance hash function may be configured to compute the hash values of the images, the query image and/or the reference image such that these hash values may be less sensitive to brightness or scale attacks compared to an application in which the hash values of the images, the query image and/or the reference image are computed by means of the Man-Hildreth-operator.

According to one embodiment, the method further comprises selecting the reference image on the basis of a usage of the reference image within the image database. According to one example, the reference image is one of the images of the image database. In another example, the reference image is a preconfigured image. In an embodiment, the preconfigured image is generated on the basis of the images of the image database or a further image database.

According to one embodiment, the method further comprises computing values of several similarity measures of the query image. For each of the several similarity measures of the query image a respective value may be computed. Furthermore, the method may further comprise performing a respective comparison of the value of the respective similarity measure of the query image with the metadata of the partitions. According to this embodiment, the metadata may comprise for each similarity measure a respective global value for each partition. Hence, to each partition several global values may be assigned, wherein each of the several global values of each partition may be assigned to one of the several similarity measures.

The respective global value for each partition may be determined on the basis of the values of the respective similarity measure being assigned to the images of the respective partition. According to this embodiment, the at least one partition of the image database may be discarded on the basis of the comparisons of the values of the similarity measures of the query image with the metadata. In an embodiment, discarding results in the set of the remaining partitions. Using more than one similarity measure for performing the discarding may result in a more refined process of a determination of the remaining partitions. Thus, the similar image may be found quicker and with less computational effort.

According to an embodiment, the values of the similarity measures of the respective image are computed by means of a respective perceptual hash function. According to this embodiment, the respective perceptual hash function is configured to compute a respective feature vector of the respective image on the basis of the respective image. Furthermore, the respective perceptual hash function may be configured to compute a respective hash value of the respective image on the basis of the respective feature vector. The respective hash value of the respective image may be assigned to the respective similarity measure.

The value of the respective similarity measure of the respective image may be dependent on the respective hash value of the respective image. The method may further comprise computing the value of the respective similarity measure of the query image by means of the respective perceptual hash function and the feature vector of the query image. This embodiment may combine the advantages of computing the values of one or more similarity measure by means of at least one perceptual hash function and the advantage of using the several similarity measures. Thus, the respective values of the similarity measures may be very compact and sensitive to changes in the respective feature vectors and, in addition to that, the remaining partitions may be found more efficiently.

According to one embodiment, the value of the respective similarity measure of the respective image is dependent on the respective hash value of the respective image and a hash value of a respective reference image. The respective similarity measure may be assigned to the respective reference image, in one example. The hash value of the respective reference image may be computed by means of the respective perceptual hash function.

According to this embodiment, the method may further comprise computing the value of the respective similarity measure of the query image on the basis of the hash value of the respective reference image and a hash value of the query image. The hash value of the query image may be computed by means of the respective perceptual hash function. The respective similarity measure of the respective image and the respective similarity measure of the query image may be each a distance measure. The respective similarity measure of the respective image may indicate a respective distance of the respective hash value of the respective image to the hash value of the respective reference image. The respective similarity measure of the query image may indicate a distance of the hash value of the query image to the hash value of the respective reference image.

Using more than one reference image for computing the values of the several similarity measures may result in a more comprehensible process of the determination of the remaining partitions. To each similarity measure, one of the reference images may be assigned. The reference images may each be an image of one image class. Hence, the reference images may provide several different image classes. For example, the image categories may comprise plants as a first image class, humans as a second image class, and buildings as a third image class.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention may be implemented using a computing device that may also be referred to as a computer system, a client, or a server. Referring now to FIG. 1, a schematic of an example of a computer system 10 is shown. The computer system 10 may be only one example of a suitable computer system and may be not intended to suggest any limitation as to the scope of use or functionality of embodiments of the invention described herein. Regardless, computer system 10 is capable of being implemented and/or performing any of the functionality set forth hereinabove.

The computer system 10 may comprise a computer system/server 12, which may be operational with numerous other general purpose or special purpose computing system environments or configurations. Examples of well-known computing systems, environments, and/or configurations that may be suitable for use with computer system/server 12 include, but are not limited to, an image database 300, shown in FIG. 3, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Figure 3:
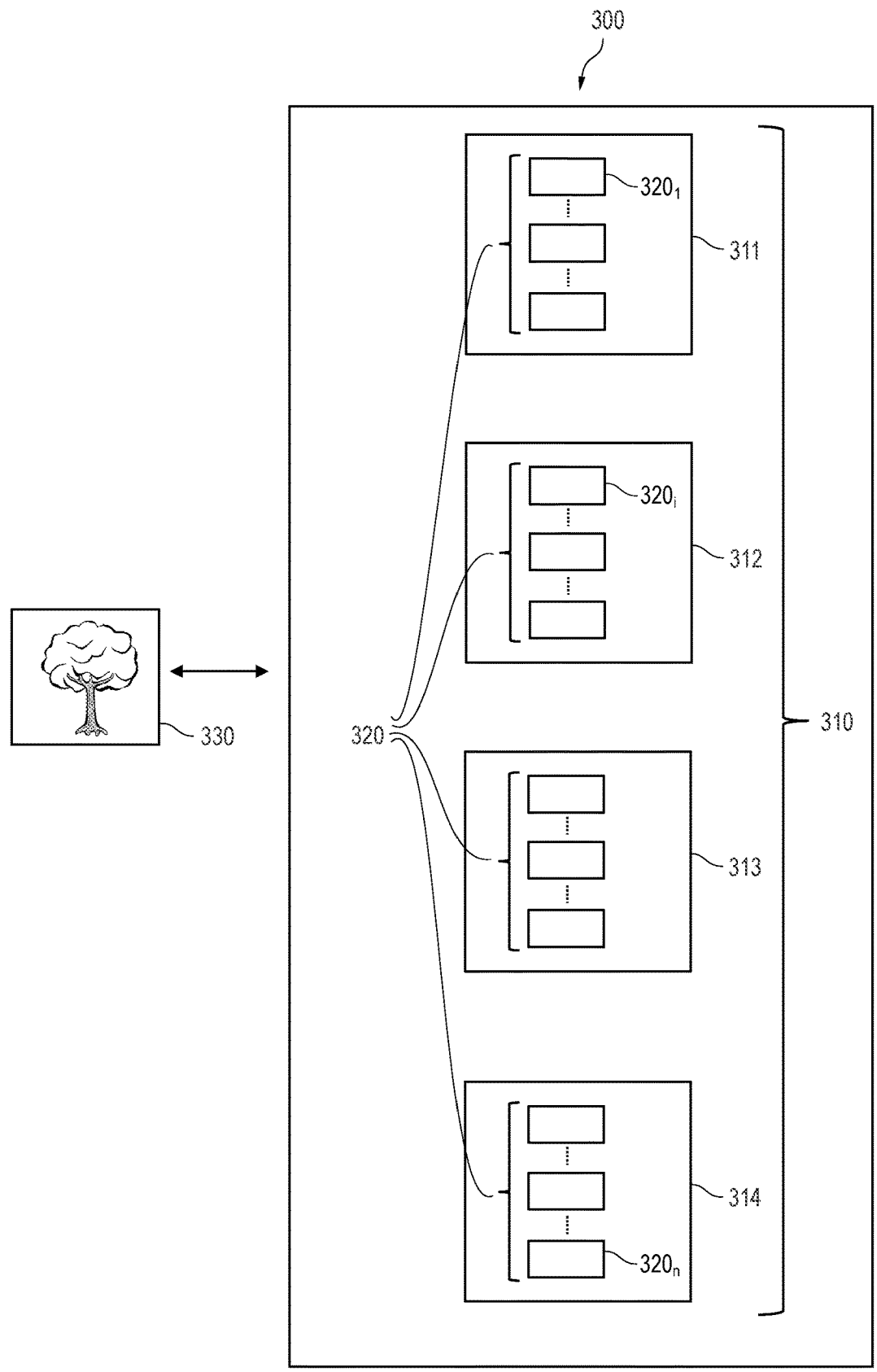
FIG. 3 depicts an image database comprising partitions of images in accordance with at least one embodiment of the present invention.

In one example, the computer system/server 12 may be designed in the form of an image database management system 310, shown in FIG. 3. The database management system 310 may comprise the image database 300.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computer system 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus and Peripheral Component Interconnect Express (PCIe) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30, a solid-state-drive (SSD) and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 50, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 50 generally may be configured to carry out the functions and/or methodologies of embodiments of the invention as described herein.

The term "program" or "program module" as used herein refers to a set of instructions which contains commands to provoke actions performed by the processor 16 when the processor 16 may read the commands. The set of instructions may be in the form of a computer-readable program, routine, subroutine or part of a library, which may be executed by the processor 16 and/or may be called by a further program being executed by the processor 16. Preferably the program modules 50 may be executable programs which are compiled according to a type of hardware platform of the computer system/server 12.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 may communicate with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
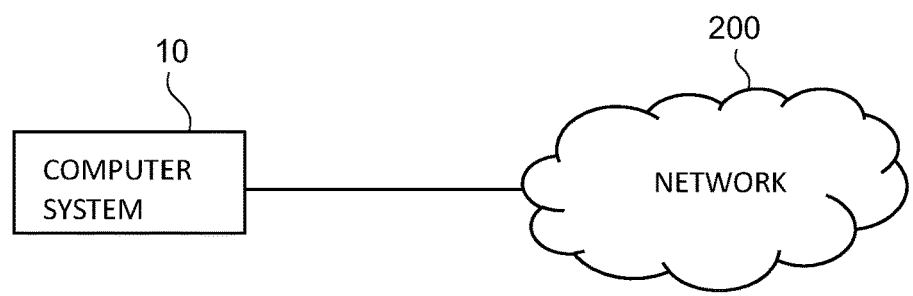
FIG. 2 depicts a network connected to the computer system of FIG. 1 in accordance with at least one embodiment of the present invention.

FIG. 2 shows an exemplary computing environment where a computer system such as computer system 10 is connected, e.g., using the network adapter 20, to a network 200. Without limitation, the network 200 may be a communications network such as the internet, a local-area network (LAN), a wireless network such as a mobile communications network, and the like. The network 200 may comprise a computing network such as a cloud-computing network. The computer system 10 may receive data to be processed from the network 200 and/or may provide a computing result to another computing device connected to the computer system 10 via the network 200.

A computer system such as the computer system 10 shown in FIG. 1 may be used for performing operations disclosed herein such as a first, second, third, fourth, fifth and sixth operation. For example, the processor 16 may perform the first, second, third, fourth, fifth and sixth operation.

Figure 4:
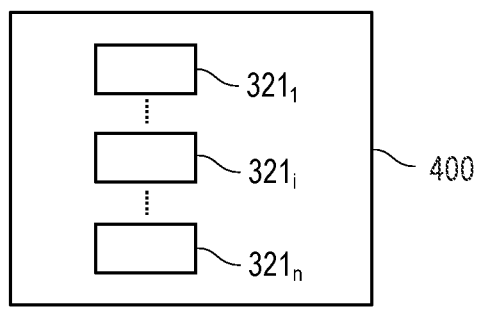
FIG. 4 depicts a table with values of a similarity measure of the images shown in FIG. 3 in accordance with at least one embodiment of the present invention.

The computer system 10 may be configured for searching for a similar image in the image database 300. The image database 300 may comprise partitions 310 with images 320. Each image $320_i$ may be assigned to a respective value $321_i$ of a similarity measure, according to a first use case. The system memory 28 may store the image database 300. Furthermore, the system memory 28 may store the respective value $321_i$ of the similarity measure of each image $320_i$ of the images 320, for example in the form of a table 400, shown in FIG. 4.

The first operation may comprise providing a query image 330. The query image 330 may be loaded via the network 200 and the network adapter 20 into the system memory 28.

The second operation may comprise computing a value of the similarity measure of the query image 330. According to a variant of the first use case, the value of the similarity measure of the query image 330 may be a number of detected edges of the query image 330. Analogously, the value $321_i$ of the similarity measure of the respective image $320_i$ may be a respective number of detected edges of the respective image $320_i$.

The third operation may comprise performing a comparison of the value of the similarity measure of the query image 330 with metadata of the partitions 310. The metadata may comprise at least one respective global value of the similarity measure of each partition $320_i$. The respective global value may be determined on the basis of the values of the similarity measure being assigned to the images of the respective partition. The processor 16 may perform such a determination of the global values. In one example, the partitions 310 may comprise a first partition 311, a second partition 312, a third partition 313, and a fourth partition 314. In this case, the processor 16 may select the global value of the first, second, third, and fourth partitions from the values of the similarity measure being assigned to the images of the first, second, third, and fourth partitions respectively.

Figure 5:
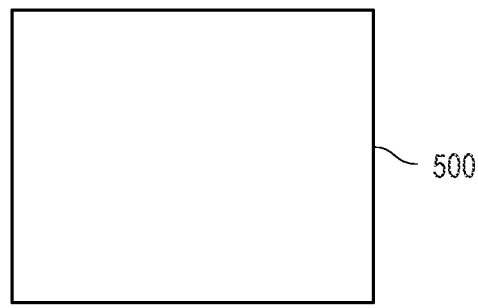
FIG. 5 depicts a metadata file comprising global values of the similarity measure being assigned to each partition of the partitions shown in FIG. 3 in accordance with at least one embodiment of the present invention.

The first, second, third and fourth global values may be a respective maximal number of edges, in one variant of the first use case. Hence, the processor 16 may select the respective global value as the maximal value of the similarity measure of the respective partition. According to a further variant, the metadata may comprise a respective further global value of the similarity measure of each partition $320_i$. The respective further global value of the similarity measure may be a respective minimal number of edges, in one example. The system memory 28 may store the global values and the further global values in a metadata file 500, shown in FIG. 5.

The processor 16 may perform the comparison of the value of the similarity measure of the query image 330, in the following referred to as query value, with the metadata. For example, the processor 16 may compare the query value with the global value and the further global value of each partition. Performing the comparison may comprise checking whether the query value lies between the global value and the further global value of each partition. For example, the query image 330 may be an image of a human and may comprise no edges but curvy lines. Thus, in this case, the query value may be zero. The second partition may comprise only pictures of buildings, each picture of the buildings comprising at least one edge. In this case, the further global value of the second partition may be greater or equal to one and the query value may not lie between the global value and the further global value of the second partition.

The fourth operation may comprise performing a discarding of at least one partition of the image database 300 on the basis of the comparison of the query value with the metadata. The discarding may result in a set of remaining partitions. For example, if the query value does not lie between the global value and the further global value of a respective partition, this partition may be discarded. According to the example given above, the second partition may be discarded if the query value is zero. A discarded partition may not be part of the set of the remaining partitions.

The fifth operation may comprise performing a comparison of the images of at least one of the remaining partitions with the query image 330. For example, if the second partition is discarded, the first, third and fourth partitions may form the set of the remaining partitions. The processor 16 may compare the query image 330 with the images of the first, third and fourth partitions, for example by applying the above described pattern recognition.

The sixth operation may comprise selecting at least one image of the at least one partition of the remaining partitions as the similar image on the basis of the comparison of the images 320 of at least one of the remaining partitions with the query image 330.

The processor 16 may perform the first, second, third, fourth, fifth, and sixth operations by executing a first program module 41, a second program module 42, a third program module 43, a fourth program module 44, a fifth program module 45, and sixth program module 46, respectively. The first processor 102 may execute a main program. The main program may initiate an execution of the program modules 41, 42, 43, 44, 45, and 46 on the processor 16.

The computer system 10 may be a standalone computer with no network connectivity that may receive data to be processed through a local interface. Such operation may, however, likewise be performed using a computer system that is connected to a network such as a communications network and/or a computing network.

The computer system 10 may perform operations described herein, such as the first, second, third, fourth, fifth, and sixth operations entirely or in part, in response to a request received via the network 200. In particular, the computer system 10 may perform such operations in a distributed computation together with one or more further computer systems that may be connected to the computer system 10 via the network 200. For that purpose, the computing system 10 and/or any further involved computer systems may access further computing resources, such as a dedicated or shared memory, using the network 200.

According to one example, the values 321$_i$ of the similarity measure of the respective image 320$_i$ may each indicate a degree of similarity of the respective image 320$_i$ to a reference image. In this example, the value of the similarity measure of the query image 330 may indicate a degree of similarity of the query image 330 to the reference image. In a variant of this example, to each image 320$_i$, a respective value of a first similarity measure and at least a second similarity measure is assigned. The value of the first and second similarity measures of the respective image 320$_i$ may describe a perceptual distance of the respective image 320$_i$ to a first reference image and a second reference image, respectively. The first image may be an image of a building and the second reference image may be an image of a human, in one example. In one example, the value of the first and second similarity measures of the respective image 320$_i$ may be a number indicating a difference of the number of edges of the respective image 320$_i$ to a number of edges of the first and the second reference image, respectively.

Following the latter example, the value of the first and second similarity measures of the query image 330 may each be a further number indicating a difference of the number of edges of the query image 330 to the number of the edges of the first and the second reference image, respectively. In this example, the metadata may be the minimal value of the first and second similarity measures of each partition. The processor 16 may check whether the value of the first or the second similarity measure of the query image 330 is lower. If the value of the first similarity measure of the query image 330 is the lower one of the two values, the first similarity measure may be used for the discarding, else the second similarity measure. In this example, the discarded partition may be the partition of the partitions 310 being assigned to the greatest minimal value of the first similarity measure or the second similarity measure if the second similarity measure is used for the discarding.

In the following, a second use case of the presented method is described.

Figure 6:
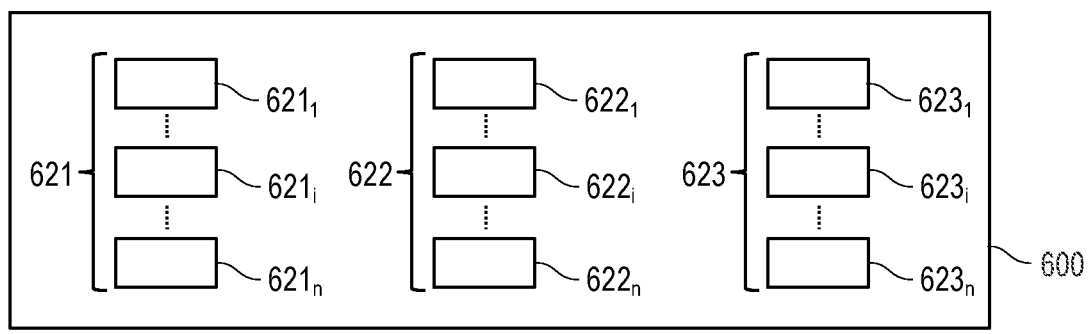
FIG. 6 depicts a table of values of a first, second and third similarity measure being assigned to the images of the partitions shown in FIG. 3 in accordance with at least one embodiment of the present invention.
Figure 7:
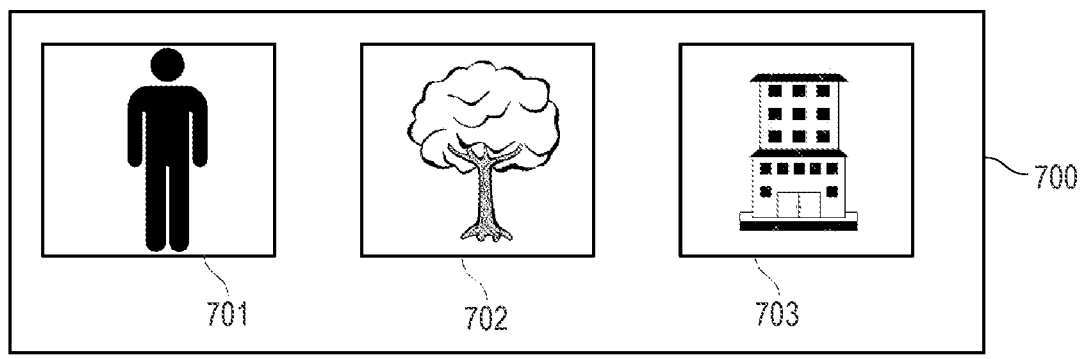
FIG. 7 depicts a set of reference images in accordance with at least one embodiment of the present invention.

The system memory 28 may store the first values 621, the second values 622 and the third values 623 in the form of a reference table 600, shown in FIG. 6. In addition, the system memory 28 may store the first reference image 701, the second reference image 702 and the third reference image 703 as a set of reference images in the form of a reference file 700, shown in FIG. 7. To give an example, the first reference image 701 may be an image of a human, the second reference image 702 may be an image of a plant, and the third reference image 703 may be an image of a building.

In the second use case, a respective first value 621$_i$ of a first similarity measure, a respective second value 622$_i$ of a second similarity measure, and a respective third value 623$_i$ of a third similarity measure may be assigned to each image 320$_i$. The processor 16 may compute the first value 621$_i$, the second value 622$_i$ and the third value 623$_i$ of the respective image 320$_i$ using a first reference image 701, a second reference image 702 and, a third reference image 703, respectively. Analogously, the processor 16 may calculate and assign a further first value of the first similarity measure, a further second value of the second similarity measure and a further third value of the third similarity measure to the query image 330.

In one example of the second use case, the further first, further second, and further third value, the first values 621, the second values 622 and the third values 623 may be a first query distance measure, a second query distance measure, a third query distance measure, respective first distance measures, respective second distance measures and respective third distance measures, respectively.

In a variant of the second use case, the first, second and third query distance measures may indicate each a distance of a hash value of the query image 330 to the hash value of the first reference image 701, the second reference image 701 and the third reference image 701, respectively. Analogously, the respective first, second and third distance measures may each indicate a distance of a hash value of the respective image 320$_i$ to the hash value of the first reference image 701, the second reference image 701 and the third reference image 701, respectively.

Figure 8:
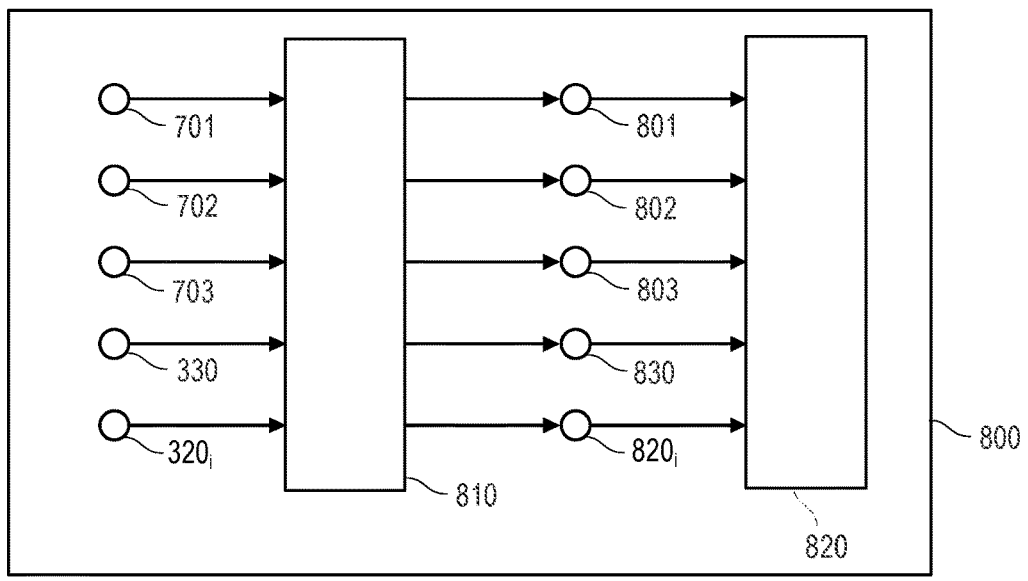
FIG. 8 depicts a block diagram of a perceptual hash function in accordance with at least one embodiment of the present invention.

In an embodiment, the processor 16 computes the respective hash value of the first, second and third reference image 701, 702, 703, the query image 330 and the images 320 by means of a perceptual hash function 800, shown in FIG. 8. The processor 16 may execute the perceptual hash function 800.

In an embodiment, the processor 16 computes, for example by means of a feature extraction module 810 of the perceptual hash function 800, a feature vector of the first reference image 701, in the following referred to as first feature vector 801, a feature vector of the second reference image 702, in the following referred to as second feature vector 802, a feature vector of the third reference image 703, in the following referred to as third feature vector 803, a feature vector of the query image 330, in the following referred to as query feature vector 830 and a feature vector of the respective image 320$_i$, in the following referred to as respective image feature vector 820$_i$, each on the basis of the first reference image 701, the second reference image 702, the third reference image 703, the query image 330 and the respective image 320$_i$ respectively.

The expression "module", as used herein, may also describe any known or later developed hardware, software, firmware, artificial intelligence, fuzzy-logic or combination of hardware and software that is able to execute the function associated with the respective "module".

The feature vectors 801, 802, 803, 830, and 820$_i$ may each express respective features of the first reference image 701, the second reference image 702, the third reference image 703, the query image 330 and the respective image 320$_i$ respectively. These respective features may each describe a color or a brightness distribution of the first reference image 701, the second reference image 702, the third reference image 703, the query image 330 and the respective image 320$_i$ respectively.

In an embodiment, processor 16 determines, for example by means of a compression module 820 of the perceptual hash function 800, the hash value of the first reference image 701, the second reference image 702, the third reference image 703, the query image 330 and the respective image 320$_i$ on the basis of the first feature vector 801, the second feature vector 802, the third feature vector 803, the query feature vector 830 and the respective image feature vector 820$_i$, respectively.

In an embodiment, the perceptual hash function 800 is one of the above mentioned perceptual hash functions, such as the average hash function, the radial variance hash function. In one example, the perceptual hash function 800 may comprise the Marr-Hildreth-operator and/or may be configured to compute the respective feature vector of the respective image 320$_i$ using the discrete cosine transformation as mentioned above.

In an embodiment, the processor 16 determines the first, second and third query distance measure each as a distance of the hash value of the query image 330 to the hash value of the first reference image 701, the second reference image 702, and the third reference image 703, respectively. According to one example, the processor 16 calculates the first, second and third query distance measure as a respective hamming distance between the hash value of the query image 330 and the hash value of the first reference image 701, the second reference image 702, and the third reference image 703, respectively. According to a further example, the respective distance measures is computed as a respective normalized hamming distance.

In an embodiment, processor 16 determines the first, second and third distance measures each as a distance of the hash value of the respective image $320_i$ to the hash value of the first reference image 701, the second reference image 702, and the third reference image 703, respectively. According to one example, the processor 16 calculates the first, second and third distance measures each as a respective hamming distance between the hash value of the respective image $320_i$ and the hash value of the first reference image 701, the second reference image 702, and the third reference image 703, respectively.

Figure 9:
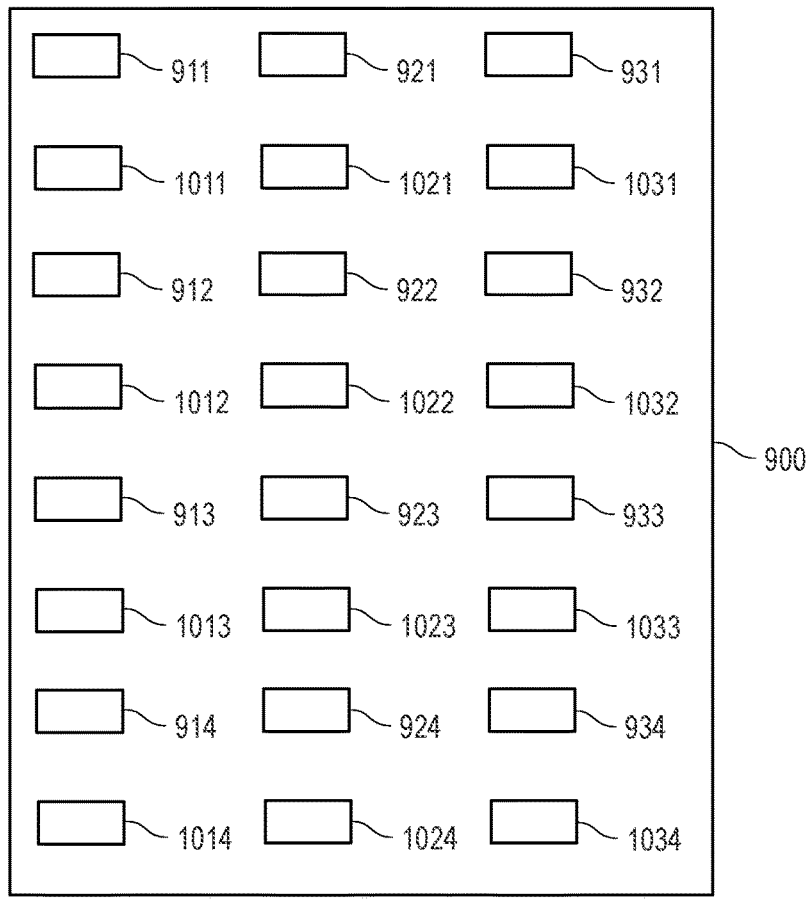
FIG. 9 depicts a further metadata file comprising global values of the first, second and third similarity measure each being assigned to each partition of the partitions shown in FIG. 3 in accordance with at least one embodiment of the present invention.

As shown in FIG. 9, a first global minimal value 911, a second global minimum value 912, a third global minimum value 913, and a fourth global minimal value 914 of the first similarity measure are stored as metadata in the form of a further metadata file 900. With respect to the second use case and considering a number of partitions 310 being equal to four, the first, second, third, and fourth global minimal values 911-914 may identify the minimal value of the first similarity measure of the images $320_i$ of the first partition 311, the second partition 312, the third partition 313, and the fourth partition 314, respectively. As further shown in FIG. 9, a first global minimum value 921, a second global minimum value 922, a third global minimum value 923, and a fourth global minimum value 924 of the second similarity measure are stored as metadata in the form of the further metadata file 900. Each of the first, second, third, and fourth global minimal values 921-924 may identify the minimal value of the second similarity measure of the images $320_i$ of the first partition 311, the second partition 312, the third partition 313, and the fourth partition 314, respectively.

As further shown in FIG. 9, a first global minimum value 931, a second global minimum value 932, a third global minimum value 933, and a fourth global minimum value 934 of the third similarity measure are stored as metadata in the form of the further metadata file 900. Each of the first, second, third, and fourth global minimal values 931-934 of the third similarity measure may identify the minimal value of the third similarity measure of the images $320_i$ of the first partition 311, the second partition 312, the third partition 313, and the fourth partition 314, respectively.

According to a further variant of the second use case, the metadata may comprise a first, a second, a third, and a fourth global maximal value of the first similarity measure which may each identify the maximal value of the first similarity measure of the images $320_i$ of the first partition 311, the second partition 312, the third partition 313, and the fourth partition 314, respectively. The first, second, third, and fourth global maximal values of the first similarity measure may be labeled as 1011, 1012, 1013, and 1014, respectively.

In an embodiment, the metadata comprises a first, a second, a third, and a fourth global maximal value of the second similarity measure which may each identify the maximal value of the second similarity measure of the images $320_i$ of the first partition 311, the second partition 312, the third partition 313, and the fourth partition 314, respectively. The first, second, third, and fourth global maximal value of the second similarity measure may be labeled as 1021, 1022, 1023, and 1024, respectively.

In an embodiment, the metadata comprises a first, a second, a third, and a fourth global maximal value of the third similarity measure which may each identify the maximal value of the third similarity measure of the images $320_i$ of the first partition 311, the second partition 312, the third partition 313, and the fourth partition 314, respectively. The first, second, third, and fourth global maximal value of the third similarity measure may be labeled as 1031, 1032, 1033, and 1034, respectively.

Referring to the second use case, the processor 16 may perform a respective comparison of the value of the respective similarity measure of the query image 330, i.e. the further first value of the first similarity measure, the further second value of the second similarity measure, and the further third value of the third similarity measure, with the metadata of the partitions 310.

In a first application example, the query image 330 may be an image of an oak tree. Given this example, the further second value of the second similarity measure may be lower than the further first value of the first similarity measure and the further third value of the third similarity measure.

According to a variant of the first application example, the third partition 313 may only comprise images of human beings and buildings and the first, second, and fourth partitions 311, 312, 314 each comprise at least one image of a tree. In this case, the following condition, in the following referred to as first condition, may be fulfilled: the third global minimal value of the second similarity measure 923 may be greater than the further second value of the second similarity measure and the first, second, and fourth global minimal values of the second similarity measures 921, 922, 924 may be less than the third global minimal value of the second similarity 923 measure.

In an embodiment, processor 16 tests whether the first condition is fulfilled. If the first condition is fulfilled, the processor 16 discards the third partition and builds a set of the remaining partitions such that this set may comprise the first, second, and fourth partitions 311, 312, and 314.

According to one example, the processor 16 selects one of the several similarity measures, for example one of the first, the second, and the third similarity measures, on the basis of the query image 330. For example, the processor 16 may determine the selected similarity measure as the one which is assigned to the lowest value of the further first, further second and further third values. For example, if the further second value is the lowest value, the second similarity measure may be the selected similarity measure. In doing so, the query image 330 may be classified on the basis of the reference images 701, 702, and 703. In an embodiment, the discarding is performed using the selected similarity measure, in one example. A partition of the partitions 310 may be discarded if that partition may be assigned to the greatest global minimal value of the selected similarity measure. Referring to the second use case, the greatest global minimal value of the selected similarity measure may be the greatest global minimal value of the first, second, third, and fourth global minimal values.

With respect to the second use case, the processor 16 may perform a comparison of the images of at least one of the remaining partitions with the query image 330. Furthermore, the processor 16 may select at least one image of the at least one partition of the remaining partitions as the similar image on the basis of the comparison of the images of the at least one of the remaining partitions with the query image 330.

According to a further example, the processor 16 compare the further first, second and third value with the first, second, third and fourth global minimal and maximal value of the first, second and third similarity measure respectively. Such a comparison may be referred to as a multi variable comparison. The multi variable comparison may allow a more refined determination of the discarded partition or partitions. The processor 16 may perform an evaluation of each partition with respect of a potential discarding of the respective partition on the basis of the multi variable comparison.

The processor 16 may receive a command via the I/O interfaces 22 for searching for a similar image within the image database 300. The command may have the form of a query language, for example:

"SELECT *FROM THINGS T WHERE T.PICTURE~=: query image 330".

The reference images 701, 702, and 703 may be changed over the lifetime of the image database 300. In response to a change in the set of the reference images, the first values 621, the second values 622, and the third values 623 each may be updated dependent on which of the reference images have been changed.

Figure 10:
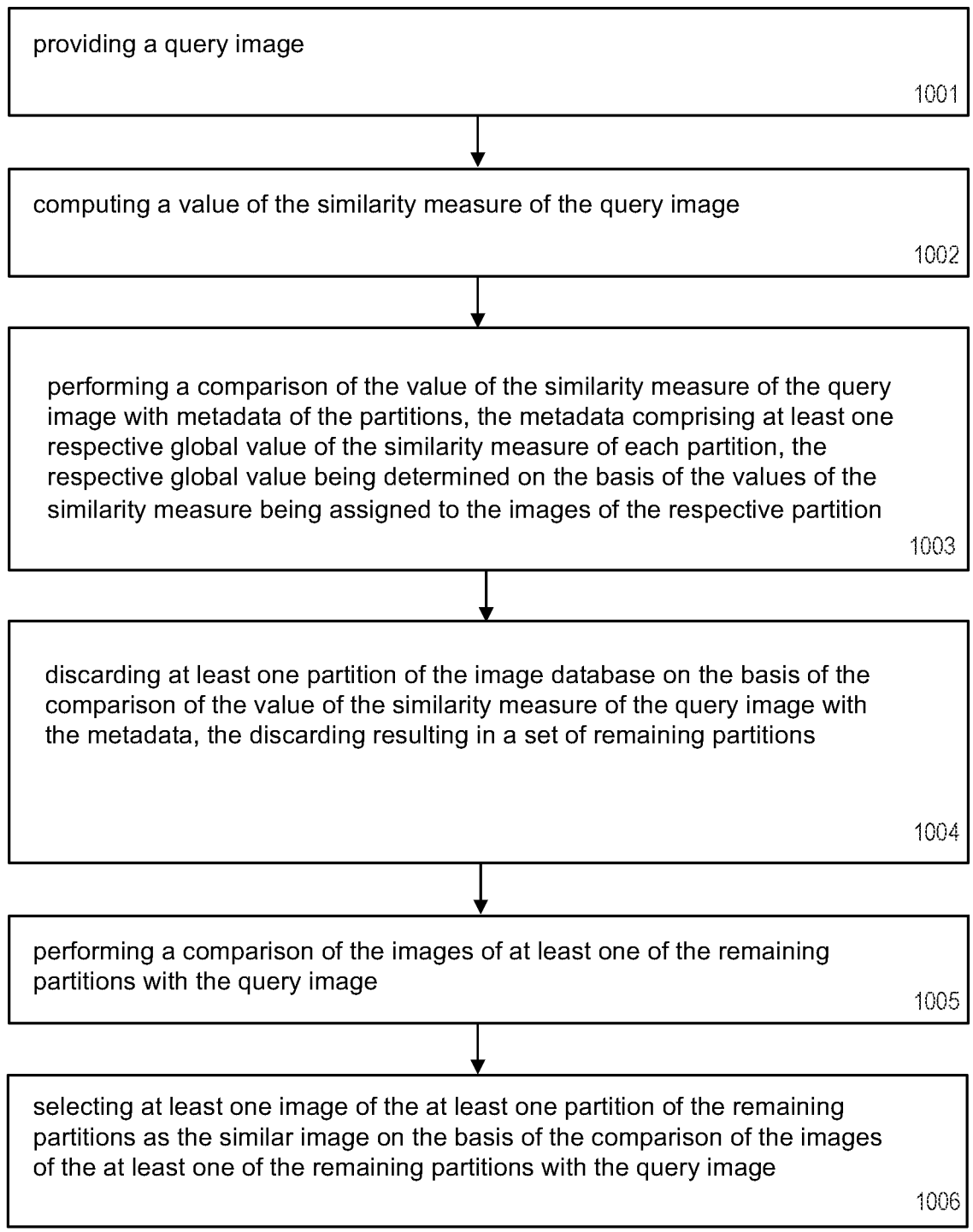
FIG. 10 depicts a flowchart of a computer implemented method for searching a similar image to a query image within the image database shown in FIG. 3 in accordance with at least one embodiment of the present invention.

FIG. 10 shows a flowchart of a computer implemented method for searching the similar image or various similar images in the image database 300.

In step 1001, the processor 16 receives a query image 330.

In step 1002, the processors 16 computes a value of a similarity measure of the query image 330.

In step 1003, the processors 16 compares the value of the similarity measure of the query image 330 with metadata of the partitions 310.

In step 1004, the processor 16 discards at least one partition of the partitions 310 of the image database 300 based on the comparison of the value of the similarity measure of the query image 330 with the metadata. The discarding may result in the set of the remaining partitions.

In step 1005, the processor 16 compares the images 320$_i$ of at least one of the remaining partitions with the query image 330.

In step 1006, the processor 16 selects at least one image of the at least one partition of the remaining partitions as the similar image based on the comparison of the images 320$_i$ of the at least one of the remaining partitions with the query image 330.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for searching for a similar image in an image database, the image database comprising partitions with images, comprising:
   receiving, by a computer, a query image;
   extracting, by the computer, one or more features of the query image, wherein extracting one or more features comprises performing pattern recognition to detecting a number of edges in the query image;
   computing, by the computer, a value of a similarity measure of the query image, wherein the value of the similarity measure is based, at least in part, on the number of edges in the query image, and further classifying the query image based on one or more classification reference images;
   comparing, by the computer, the value of the similarity measure of the query image with metadata of the partitions, the metadata comprising at least one respective global value of the similarity measure of each partition and a respective range of a number of edges of a respective partition, the respective global value being determined based on respective values of similarity measures assigned to the images of the respective partition;
   discarding, by the computer, at least one partition of the image database based on the comparison of the value of the similarity measure of the query image to the respective range of the number of edges of the respective partition;
   comparing, by the computer, the images of at least one of the remaining partitions with the query image; and
   selecting, by the computer, at least one image of the at least one partition of the remaining partitions as the similar image based on the comparison of the images of the at least one of the remaining partitions with the query image.

2. The computer implemented method of claim 1, each value of the similarity measure of a respective image indicating a degree of similarity of the respective image to a reference image, the value of the similarity measure of the query image indicating a degree of similarity of the query image to the reference image.

3. The computer implemented method of claim 2, the method further comprising: selecting, by the computer, the reference image based on a usage of the reference image within the image database, the reference image being one of the images of the image database.

4. The computer implemented method of claim 1, wherein the respective global value of the similarity measure of each partition is a maximal value of the similarity measure of the respective partition.

5. The computer implemented method of claim 1, wherein the respective global value of the similarity measure is a minimal value of the similarity measure of the respective partition.

6. The computer implemented method of claim 1, wherein a value of the similarity measure of a respective image is generated based on a perceptual hash function, the perceptual hash function being configured to compute a feature vector of the respective image on the basis of the respective image and a respective hash value of the respective image on the basis of the feature vector of the respective image, the value of the similarity measure of the respective image being dependent on the respective hash value of the respective image, and the computer implemented method further comprising computing the value of the similarity measure of the query image by means of the perceptual hash function and a feature vector of the query image.

7. The computer implemented method of claim 6, wherein the value of the similarity measure of the respective image being dependent on the respective hash value of the respective image and a hash value of a reference image, the hash value of the reference image being computed by means of the perceptual hash function, the method further comprising computing the value of the similarity measure of the query image on the basis of the hash value of the reference image and a hash value of the query image, the hash value of the query image being computed by means of the perceptual hash function.

8. The computer implemented method of claim 7, wherein the similarity measure of the respective image and the similarity measure of the query image are each a respective distance measure, the similarity measure of the respective image indicating a respective distance of the respective hash value of the respective image to the hash value of the reference image, and the similarity measure of the query image indicating a distance of the hash value of the query image to the hash value of the reference image.

9. The computer implemented method of claim 8, wherein the respective distance measure of the respective image and the distance measure of the query image are each a hamming distance.

10. The computer implemented method of claim 8, wherein the respective distance measure of the respective image and the distance measure of the query image are each a normalized hamming distance.

11. The computer implemented method of claim 6, wherein the perceptual hash function is an average hash function.

12. The computer implemented method of claim 6, the perceptual hash function being configured to compute the respective feature vector of the respective image using a discrete cosine transformation, and the computer implemented method further comprising computing the feature vector of the query image using the discrete cosine transformation.

13. The computer implemented method of claim 6, wherein the perceptual hash function is a radial variance hash function.

14. The computer implemented method of claim 1, the method further comprising:
  computing, by the computer, values of several similarity measures of the query image;
  performing, by the computer, a respective comparison of the value of the respective similarity measure of the query image with the metadata of the partitions, the metadata comprising, for each similarity measure, a respective global value for each partition, the respective global value for each partition being determined based on the values of the respective similarity measure being assigned to the images of the respective partition; and
  discarding, by the computer, the at least one partition of the image database based on the comparisons of the values of the similarity measures of the query image with the metadata.

15. The computer implemented method of claim 14, wherein the values of the similarity measures of the respective image is generated based on a respective perceptual hash function, the respective perceptual hash function being configured to compute a respective feature vector of the respective image on the basis of the respective image and a respective hash value of the respective image on the basis of the respective feature vector, the value of the respective similarity measure of the respective image being dependent on the respective hash value of the respective image, and the computer implemented method further comprising computing the value of the respective similarity measure of the query image by means of the respective perceptual hash function and a feature vector of the query image.

16. The computer implemented method of claim 15, wherein the value of the respective similarity measure of the respective image being dependent on the respective hash value of the respective image and a hash value of a respective reference image, the hash value of the respective reference image being computed by means of the respective perceptual hash function, and the computer implemented method further comprising computing the value of the respective similarity measure of the query image on the basis of based on the hash value of the respective reference image and a hash value of the query image, the hash value of the query image being computed by means of the respective perceptual hash function, wherein the respective similarity measure of the respective image and the respective similarity measure of the query image are each a distance measure, the respective similarity measure of the respective image indicating a respective distance of the respective hash value of the respective image to the hash value of the respective reference image, and the respective similarity measure of the query image indicating a distance of the hash value of the query image to the hash value of the respective reference image.

17. A computer program product for searching for a similar image in an image database, the similar image being similar to a query image, and the image database comprising partitions with images the computer program product comprising one or more computer-readable storage media and program instructions stored on the one or more computer readable storage media, the program instructions including instructions to:
  receive a query image;
  extract, one or more features of the query image, wherein extracting one or more features comprises performing pattern recognition to detecting a number of edges in the query image; compute a value of a similarity measure of the query image, wherein the value of the similarity measure is based, at least in part, on the number of edges in the query image, and further classify the query image based on one or more classification reference images;
  compare the value of the similarity measure of the query image with metadata of the partitions, the metadata comprising at least one respective global value of the similarity measure of each partition and a respective range of a number of edges of a respective partition, the respective global value being determined based on respective values of similarity measures assigned to the images of the respective partition;
  discard at least one partition of the image database based on the comparison of the value of the similarity measure of the query image to the respective range of the number of edges of the respective partition;
  compare the images of at least one of the remaining partitions with the query image; and
  select at least one image of the at least one partition of the remaining partitions as the similar image based on the comparison of the images of the at least one of the remaining partitions with the query image.

18. A computer system for searching a similar image in an image database, the similar image being similar to a query image, the image database comprising partitions with images, each image being assigned to a respective value of a similarity measure for comparing the respective image with the query image, comprising:
  one or more computer processors;
  one or more computer readable storage media; and
  computer program instructions, the computer program instructions being stored on the one or more computer readable storage media for execution by the one or more computer processors, and the computer program instructions including instructions to:
  receive a query image;
  extract, one or more features of the query image, wherein extracting one or more features comprises performing pattern recognition to detecting a number of edges in the query image;
  compute a value of a similarity measure of the query image, wherein the value of the similarity measure is based, at least in part, on the number of edges in the query image, and further classify the query image based on one or more classification reference images;
  compare the value of the similarity measure of the query image with metadata of the partitions, the metadata comprising at least one respective global value of the similarity measure of each partition and a respective range of a number of edges of a respective partition, the respective global value being determined based on respective values of similarity measures assigned to the images of the respective partition;

discard at least one partition of the image database based on the comparison of the value of the similarity measure of the query image to the respective range of the number of edges of the respective partition;

compare the images of at least one of the remaining partitions with the query image; and select at least one image of the at least one partition of the remaining partitions as the similar image based on the comparison of the images of the at least one of the remaining partitions with the query image.

* * * * *